UNITED STATES PATENT OFFICE 2,692,250

POLYCHLOROPRENE STABILIZED WITH A HYDROXYLAMINE

Henry C. Walter, Wilmington, Del., assignor to E. I. du Pont de Nemours and Company, Wilmington, Del., a corporation of Delaware No Drawing. Application June 14, 1952,
Serial No. 293,659

9 Claims. (Cl. 260—45.9)

This invention relates to a novel composition of matter. More specifically, it concerns a polychloroprene composition having improved resistance to discoloration due to actinic action.

It is an object of the present invention to provide a polychloroprene having improved resistance to discoloration caused by actinic effects.

Another object is to provide a white polychloroprene which will not yellow upon aging when exposed to sunlight.

A further object is to provide a non-discoloring class of materials which are suitable for incorporation into polychloroprene and prevent discoloration of the composition by actinic effects.

These and other objects will become apparent in the course of the following specification and claims.

By polychloroprene is meant the rubber-like polymer of chloroprene (2-chloro-1,3-butadiene) presently referred to in the trade as "neoprene." While the method of manufacture is not critical, it is preferred to use neoprene which has been polymerized in the presence of long chain aliphatic mercaptans, as described in United States Patents Numbers 2,494,087 and 2,576,009. Such compositions avoid the presence of elemental sulfur during polymerization.

In accordance with the present invention, it has been found that the discoloration of polychloroprene due to actinic effects can be greatly inhibited by incorporation into the polychloroprene composition of from about 0.1 to about 10.0% by weight of a hydroxylamine of the formula R—O—NH$_2$, wherein R is a member of the class consisting of alkyl and aralkyl radicals, containing at least 7 carbon atoms. The aralkyl derivatives are preferred, especially those containing halogen substituents on the aromatic nuclei. It has been found particularly useful to employ such discoloration inhibitors in conjunction with approximately equal parts by weight of known non-discoloring, phenolic, rubber antioxidants.

The following examples are cited to illustrate the invention. They are not intended to limit it in any way. The polychloroprene of each example is prepared in alkaline emulsion by the polymerization of chloroprene in the presence of dodecyl mercaptan.

EXAMPLE 1

A composition is compounded by milling the following materials:

| | Parts |
|---|---|
| Polychloroprene | 100 |
| Titanium dioxide | 15 |
| Magnesium oxide | 15 |
| Zinc oxide | 5 |
| 2-mercaptoimidazoline | 0.5 |

After compounding, the composition is cured for 45 minutes at 141° C. in a polished steel mold forming a thin slab. This sample, together with a similarly-prepared sample containing, in addition, 5 parts of O-benzyl hydroxylamine, is exposed to a "sun lamp" containing both a tungsten filament and a mercury arc. At the end of 17 hours, the slab containing the O-benzyl hydroxylamine shows no effect. The blank is yellow. At the end of 70 hours of exposure, the inhibited sample is yellow while the blank is brown.

A series of samples is prepared according to the procedure of Example 1, to some of which an inhibitor for color caused by actinic effects is added as indicated in Table I.

Table I

| Example | O-Benzyl Hydroxylamine* | O-p-Chloro-Benzyl Hydroxylamine* | 2,2'-Methylene-Bis(4-Methyl-6-Tertiary Butyl Phenol)* |
|---|---|---|---|
| 2 | 0 | 0 | 0 |
| 3 | 2 | 0 | 0 |
| 4 | 0 | 2 | 0 |
| 5 | 0 | 0 | 2 |
| 6 | 1 | 0 | 1 |
| 7 | 0 | 1 | 1 |
| 8 | 2 | 0 | 2 |
| 9 | 0 | 2 | 2 |

*(Parts/100 parts neoprene).

A quantitative color determination is then made upon each sample by means of a Hunter Color and Color-Difference Meter (Journal of the Optical Society of America, volume 32 (1942), pages 509–538). By means of this instrument, it is possible to determine the red-green component of the hue, the yellow-blue component and also the lightness of the color. Each of the samples is then subjected to a carbon arc lamp for a period of 40 hours. The exposure is interrupted at the 20-hour mark for an observation of each of the 3 color components. The final observation is made at the end of the 40 hours. The results obtained are shown in Table II. From observations made before and after exposure to actinic rays, a total color change, ΔE, can be computed as the vectorial sum of the change in each of these quantities. These computations appear in Table III.

*Table II*

| Examples | Property Measured* | Unexposed | 20 Hours' Exposure | 40 Hours' Exposure |
|---|---|---|---|---|
| 2 | RG | −0.2 | +5.1 | +6.3 |
|   | YB | +7.4 | +29.3 | +27.8 |
|   | L  | 90.3 | 74.3 | 71.3 |
| 3 | RG | −0.1 | −2.0 | +0.4 |
|   | YB | +6.9 | +20.7 | +24.4 |
|   | L  | 91.8 | 87.6 | 80.2 |
| 4 | RG | −2.0 | −3.1 | +2.2 |
|   | YB | +6.8 | +21.5 | +27.5 |
|   | L  | 91.9 | 87.1 | 78.3 |
| 5 | RG | −0.7 | −1.1 | −0.4 |
|   | YB | +7.2 | +13.4 | +17.6 |
|   | L  | 90.8 | 85.5 | 82.9 |
| 6 | RG | −0.5 | −1.4 | −1.3 |
|   | YB | +8.3 | +12.4 | +15.6 |
|   | L  | 89.5 | 88.5 | 86.8 |
| 7 | RG | −2.0 | −2.3 | −2.3 |
|   | YB | +7.2 | +10.7 | +12.4 |
|   | L  | 91.2 | 88.9 | 88.3 |
| 8 | RG | −1.3 | −1.4 | −0.8 |
|   | YB | +7.6 | +12.7 | +14.0 |
|   | L  | 90.8 | 86.6 | 85.3 |
| 9 | RG | −2.2 | −2.0 | −2.0 |
|   | YB | +8.0 | +9.8 | +11.0 |
|   | L  | 90.6 | 89.0 | 88.5 |

*RG=red-green hue; YB=yellow-blue hue; L=lightness.

The total amount of color change for each sample over its original state is indicated in Table III.

*Table III*

| Examples | ΔE* (20 Hours) | ΔE* (40 Hours) |
|---|---|---|
| 2 | 27.1 | 28.7 |
| 3 | 14.6 | 21.0 |
| 4 | 15.5 | 24.7 |
| 5 | 8.2  | 13.1 |
| 6 | 4.6  | 7.8 |
| 7 | 4.2  | 6.0 |
| 8 | 6.8  | 8.4 |
| 9 | 2.5  | 3.6 |

*ΔE=amount of color change of each sample.

A comparison of the results obtained in Example 2 (with no inhibitor), against those obtained in Examples 3 and 4, quantitatively demonstrates the color inhibition property of the hydroxylamines of the present invention. Results of an even more striking character appear in Examples 6 to 9, inclusive. These examples demonstrate the particular efficacy of a mixture of a hydroxylamine of the class described herein with a non-discoloring, phenolic, rubber antioxidant. The particularly desirable, phenolic, rubber antioxidants are those which contain hydrocarbon substituents in the ortho and para positions such as parahydroxy biphenyl, 2,6-ditertiary butyl paracresol, the reaction products of phenols with styrene in the presence of alkylation catalysts, 2,2'-methylene bis(4-methyl-6-tertiary butyl phenol), and 2,2'-methylene bis (4,6-dimethyl phenol). However, other related materials may also be employed, as for instance, the long chain amides of p-amino phenol.

The polychloroprene into which the agents are incorporated may be in the form of a plastic solid, a solution in an organic solvent (cement), or a dispersion in water (latex). The agents are dispersed readily in polychloroprene by milling, or dissolved in the cements, or dispersed in water and then incorporated in the latex. Other methods of incorporation may also be used, such as dispersing the agents in the polychloroprene which is then dissolved to form a cement or incorporating them in latex which is then coagulated and worked up to form the solid plastic material.

The usual compounding ingredients may be incorporated, except that the discoloration of polychloroprene is usually of no importance in black or highly-colored stocks. Agents which are known to tend to discolor either on curing or exposure to light, such as most antioxidants containing amino groups and some vulcanization accelerators, should be avoided. For gum stocks, small amounts of magnesium oxide and zinc oxide may be used as curing agents without much decreasing of the transparency of the stocks. In white or pastel stocks, titanium pigments, along with usually larger amounts of the above oxides, are particularly useful.

Among the class of oxygen-substituted hydroxylamines useful in the present invention are included normal octylhydroxylamine, secondary octylhydroxylamine, dodecylhydroxylamine, octadecylhydroxylamine, p - bromobenzylhydroxylamine, p-methoxybenzylhydroxylamine, diphenylmethylhydroxylamine, alpha naphthylmethylhydroxylamine and beta phenethylhydroxylamine. Where the oxygen substituent is alkyl, it may be primary, secondary or tertiary—straight or branched chain. It is preferred that the number of carbon atoms in the molecule not exceed twenty.

Many equivalent modifications will be apparent to those skilled in the art without a departure from the inventive concept.

What is claimed is:
1. Polychloroprene containing minor amounts of a hydroxylamine of the formula R—O—NH$_2$, wherein R is a member of the group consisting of alkyl and aralkyl and Cl and Br substituted aralkyl radicals containing at least 7 carbon atoms.

2. Polychloroprene containing from about 0.1 to 10.0% by weight of a hydroxylamine of the formula $C_nH_{2n+1}$—O—NH$_2$, wherein $n$ is an integer of at least 7.

3. Polychloroprene containing from about 0.1 to 10.0% by weight of a hydroxylamine of the formula aralkyl—O—NH$_2$.

4. The composition of claim 3, wherein the aralkyl is benzyl.

5. A composition of matter comprising polychloroprene, minor amounts of a rubber antioxidant of the class of phenolic compounds containing hydrocarbon substituents in the ortho and para positions and minor amounts of a hydroxylamine of the formula R—O—NH$_2$, wherein R is a member of the group consisting of alkyl and aralkyl and Cl and Br substituted aralkyl radicals containing at least 7 carbon atoms.

6. The composition, as defined in claim 5, wherein the phenolic rubber antioxidant is 2,2'-methylene-bis(4-methyl-6-tertiary butyl phenol) and the hydroxylamine is O-benzyl hydroxylamine.

7. The composition, as defined in claim 5, wherein the phenolic rubber antioxidant is 2,2'-methylene-bis(4-methyl-6-tertiary butyl phenol) and the hydroxylamine is O-p-chlorobenzyl hydroxylamine.

8. As an inhibitor for color formation in polychloroprene due to actinic action, a composition of matter comprising a rubber antioxidant of the class of phenolic compounds containing hydrocarbon substituents in the ortho and para positions and a hydroxylamine of the formula R—O—NH$_2$, wherein R is a member of the class consisting of alkyl and aralkyl and Cl and Br substituted aralkyl radicals containing at least 7 carbon atoms.

9. Polychloroprene containing from about 0.1% to 10.0% by weight of O-p-chlorobenzyl hydroxylamine.

References Cited in the file of this patent

UNITED STATES PATENTS

| Number | Name | Date |
|---|---|---|
| 2,013,941 | Toung et al. | Sept. 10, 1935 |